June 30, 1970     H. R. CHANDLER     3,517,683

THERMAL PRESSURE RELIEF DEVICE

Filed Oct. 3, 1968

INVENTOR.
HERMAN R. CHANDLER
BY Harry A. Herbet Jr.
and
Herbert H. Brown
ATTORNEYS

United States Patent Office 3,517,683
Patented June 30, 1970

3,517,683
THERMAL PRESSURE RELIEF DEVICE
Herman R. Chandler, 31 Shafor Circle,
Dayton, Ohio 45409
Filed Oct. 3, 1968, Ser. No. 764,799
Int. Cl. F16k *17/38*
U.S. Cl. 137—74     8 Claims

ABSTRACT OF THE DISCLOSURE

A thermal pressure relief device is disclosed for immediately opening the fluid contents of a closed vessel to the atmosphere when the temperature of the fluid exceeds a predetermined value. It consists of two tubular portions, concentrically arranged and in contact with one another. The surface of contact is threaded so that when one portion is turned with respect to the other, the overall length of the plug can be changed and foreshortened when necessary. There are extensions at the ends of the plug which serve to clamp against the pressurized and the nonpressurized sides of a vessel, assuming that the plug is inserted in an opening in the vessel. Small round plugs of a eutectic metal (alloy) and having a tapered periphery are tamped into recesses formed in the ends of the inner tubular portion. A sphere of sealing material is positioned within a space left between these round plugs.

BACKGROUND OF THE INVENTION

The invention relates to sealing devices which are responsive to temperature and are to be used more especially in pressurized containers or vessels. There is a distinct need for an uncomplicated pressure relief device for containers carrying fluid under pressure and which would relieve the excess pressure at any time the fluid exceeds a predetermined temperature and a dangerously high pressure. One of the main uses for the improved device, while not limited to such use, is in connection with the protection of aircraft from damage caused by tire and wheel failure resulting from excessive temperature during the landing of an airplane or during the course of braking the plane to a halt. Other forms of apparatus or machines in which the improved device has particular use is in preventing explosion of aircraft oxygen tanks, also hydraulic accumulators and other pressure vessels in case of fire or other causes of overheating.

SUMMARY OF THE INVENTION

An object of the invention is to provide an improved sealing device of the type mentioned and one which permits the installation of the same device from either the pressurized or unpressurized side of the wheel or vessel. In addition, it is an object to provide an improved device which can serve as a strictly impervious seal when the contents of the vessel, wheel, etc., is at normal temperature and within the proper gas pressure limit but will immediately release the gas by a sudden but harmless blowout when the temperature and the attendant pressure exceeds a predetermined safe value. Still another object is to provide an improved seal of the type mentioned and in which the seal provides a visual indication of leakage.

BRIEF DESCRIPTION OF THE DRAWING

Other objects and features will be apparent as the specification is perused in connection with the accompanying drawings in which.

The problem eliminating the excessive pressure within a closed vessel and brought about by undue high temperatures of the contained fluid is of considerable importance. For example, when the brakes of an airplane are applied too vigorously the air or gas in the tires tends to expand rapidly, and unless release is immediately afforded, the tires, and sometimes the wheel itself, would explode. Steam boilers are also subject to rupture and perhaps explosion, should the pressure of the steam brought about by excessive temperatures rise to a value beyond the safe limit.

Figure 1:
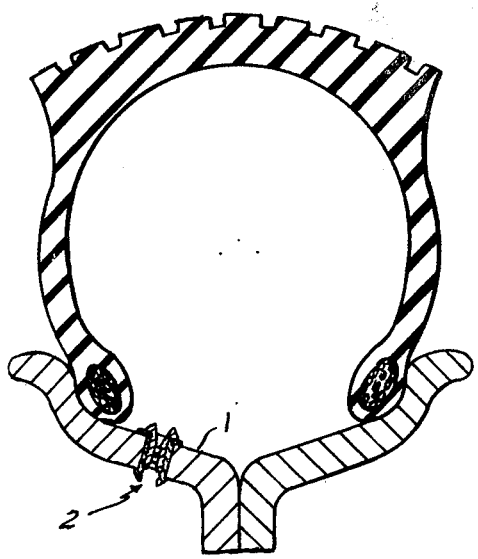
FIG. 1 depicts, on a reduced scale basis, a typical airplane tire mounted on a split wheel and showing the device of this invention inserted within the rim to be in communication with the gas in the tire.
Figure 2:
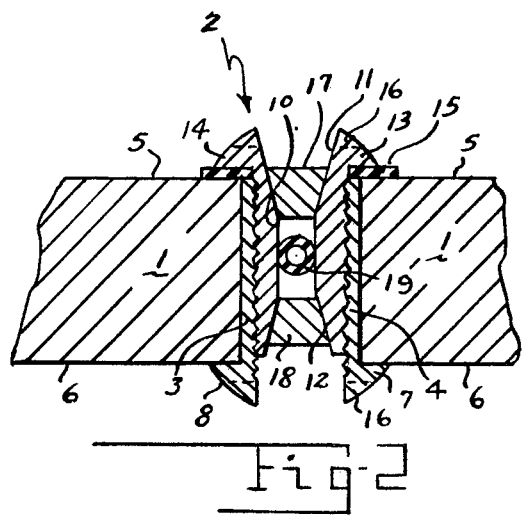
FIG. 2 is a cross-section of the improved temperature-responsive seal member installed in a fragmentary showing of the rim or other immediate surrounding metal.
Figure 3:
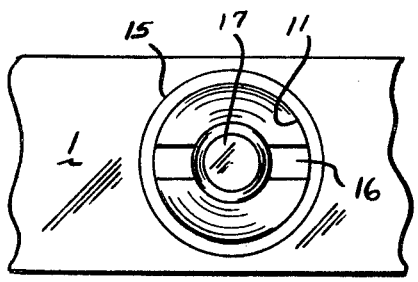
FIG. 3 illustrates a plan view of the structure shown on FIG. 2 and particularly showing the screw driver slots for adjusting the movable parts with respect to one another.

The improved pressure-releasing device takes the general form of a plug placed within the wall which separates the potentially high pressure from the low or atmospheric pressure side and in the case of a wheel and tire, an appropriate position would be in the side of the rim, as shown in FIG. 1. The pressure separating the wall of the vessel or casing to be protected is typified at 1 and the improved plug is generally indicated at 2. The latter is constituted of a number of different round parts screwed together in such manner as to accommodate any reasonable thickness of wall. The plug itself is formed, in part, of a hollow metal tubing 3 constituting the female portion. The tubing has a length greater than the thickness of the wall and is threaded throughout its length on the inside as indicated at 4. The outside or external diameter of the member 3 is such as to fairly tightly fit a round opening in the wall of the container or vessel. The upper end of the tubing is flush with the inside or pressure surface 5 of the vessel but the lower end extends beyond the nonpressurized surface of the wall and terminates in a rim or ledge 7 which has preferably an arcuate contour 8 and contacts directly the surface 6 of the wall.

The male member of the plug is also constituted of tubing, threaded on its exterior surface to engage the threads of the female member. The tubing has various thicknesses, the center portion being provided with a round aperture 10 of uniform diameter extending approximately one third of the length of the male member. The aperture tapers outwardly at both ends of the central portion to leave wedge-shaped recesses 11, 12, the purpose of which will be explained presently. The male member, as in the case of the female part, is extended but in this case, to a position beyond the pressurized surface 5 to leave a rim or ledge 13. The rim is provided with an arcuate contour 14 and a space is left between the lower surface of the ledge and the surface 5 in order to receive a flat rubber washer 15. The latter preferably extends beyond the lower edge of the arcuate surface. Since the washer merely performs the function of a seal, as will be referred to hereinafter, it is apparent that an O-ring could be substituted if desired. Each of the male and female members at their extremities are provided with slots 16 for receiving a screw driver so that as one member is turned with respect to the other, the threads force the members to move either outwardly or inwardly, as desired, with respect to one another and the ledge 7 can be made to clamp tightly against the nonppressurized surface 6. The ledge 13 can also be caused to press against the washer or O-ring 15 in order to effect a tight seal against leakage at the screw threads and also at the outer surface of the female member.

The parts of the plug may be made of any suitable metal such as steel or aluminum so long as no electrolytic corrosion is set up with respect to the metal of the wall when subjected to the particular fluid employed.

Thus, when assembled, the plug 2 has a centrally positioned opening 10 of uniform diameter and two wedge-shaped recesses formed by the outwardly extending surfaces 11, 12. In accordance with the principles of my invention, I place small plugs 17, 18, within these recesses, these plugs having tapered peripheries corresponding to the shape of the recesses and each plug extending inwardly only so far as the nearest extremity of the opening of uniform size. The plugs are of a thermally active character and may be made of any suitable temperature-responsive material, preferably a eutectic alloy which is cold setting to a solid state and melts to a liquid state without passing through the plastic stage at a temperature suitable for the particular application. These eutectic alloys are well known in the art and are sometimes termed "exotic" metals. They are graded according to the temperatures to which they are intended to react and can be readily formed to any shape desired. The alloy metal is readily procurable on the market according to the reaction temperature rating.

The plugs 17, 18 may be tamped in place by an oak dowel and mallet, the tapered surfaces 11, 12 of the recesses serving to hold them tightly in position. In the cylindrical space 10 between the plugs, I position an air seal rubber sphere 19 of a size as tightly to fit against the central opening 10. The sphere may be made of any silicone rubber such as that sold on the market under the trade name of "Vitol." This form of rubber can withstand temperatures up to 600° F. The sphere should have a thickness as to hold a firm round shape when initially installed so as to provide a tight seal.

INSTALLATION

Assuming that a round hole is drilled at a suitable position in the wall of the vessel and has a diameter as snugly to receive the outer surface of the female portion 3, the male member is then inserted by applying a screwdriver at the upper slot 16. A screwdriver is then inserted at the lower slot 16 and both tools are turned until a tight clamping action is effected at the ledges 7, 13. As stated hereinbefore, the ledge 13 will tighten against the washer 15 and thus provide a fluid-tight joint at this position. The next step is to force the eutectic plugs into the tapered recesses after having inserted the rubber sphere 19 in the space between them. It will be noted that the upper and lower, or more properly, the inner and outer surfaces of the wall are completely sealed from one another because even if gas or liquid could pass slightly along the engaging threads, the seepage will be completely blocked by the washer 15. The latter would also stop any leakage between the outside periphery of the female member and the drilled hole in the wall.

Consequently, as the temperature within the vessel, as represented by the pressurized surface 5 increases beyond the melting point of the plug 17 the latter, at the inside of the vessel, would immediately change to a liquid. The liquid and retained pressure would press against the air seal 19 and cause the latter to eject the eutectic plug 18, thus relieving the contained medium to the atmosphere. The grading of the plug material will determine the temperature when the relief is to be afforded, as such materials may be procured to melt within a wide range of 120° F. to approximately 560° F. Thus, explosive pressures brought about by a sudden increase in temperatures within the vessel can be completely and automatically avoided.

Furthermore, if the eutectic plug 17 leaks, the contained pressure moves the air seal 19 against eutectic plug 18 causing it to be ejected. This minor leakage past plug 17 is then readily detected since plug 18 is on the unpressurized side and thus available for visual inspection. These functions are available when pressurized in either direction and provide a visual warning of minor leaks.

While I have described the improved temperature-responsive pressure-reliever when considering the surface 5 as being subjected to the pressure, it is apparent that the device would operate equally well, if the surface 6 were subject to the excessively high temperature and the accompanying pressure because in this case the lower eutectic body 18 would become liquified and cause the sphere 19 to dislodge the member 17.

It is also evident that the improved plug may be installed equally well in a tapped hole, also in a hole which is not tapped. Furthermore, it may be tightened from the inside or outside of the vessel to which it is attached and will accommodate a wide range of vessel wall thickness.

I claim:

1. A temperature responsive device for relieving pressure due to an increase in temperature within a closed vessel containing a fluid, said device being positioned within an opening in the wall of the vessel and responding to temperature variations within the vessel, said device comprising a tubular member of a size as to fit snugly in said opening, and formed of two surrounding threaded portions which when turned with respect to one another causes a change in the overall length of the member, projections on the ends of said member which embrace and clamp the latter against opposite sides of the wall when said portions are turned and caused to foreshorten, said tubular member having recesses at the ends which contain plugs of a metal which, upon being heated above a predetermined temperature, changes directly to the liquid state, and means sealingly positioned in said tubular member between said plugs and responsive to a predetermined pressure to be ejected from said member.

2. A temperature responsive device for relieving excessive pressure due to an increase in temperature within a closed vessel containing fluid, said device being positioned within an opening in the wall of the vessel and responding to temperature variations within the vessel, said device being formed of two hollow cylinders contacting one another in threaded relation, the outer cylinder fitting snugly in said wall opening, and the opening in the inner cylinder being formed of three portions, the two outer portions constituting tapered recesses, and the other portion constituting a passageway of uniform diameter and extending between said recesses, temperature-responsive plugs filling said recesses, and means sealingly positioned in said passageway between said plugs and responsive to a predetermined pressure to be ejected from said passageway.

3. A temperature reponsive device according to claim 2 and in which each of the cylinders is provided with an extension which embrace respectively the interior and the exterior surfaces of the wall whereby as the two cylinders are turned with respect to one another, the extensions clamp against the opposite sides of the wall, whereby said device is held in place within the wall opening of the vessel.

4. A temperature responsive device according to claim 3 and in which said plugs are constituted of a material which is cold setting to a solid state and melts to a liquid state when the temperature within the vessel exceeds a predetermined amount.

5. A temperature responsive device according to claim 2 and in which said plugs are constituted of an eutectic alloy.

6. A temperature responsive device according to claim 2 and in which said means is constituted of a sphere of rubber having a diameter as to fit sealingly against the passageway of uniform diameter.

7. A temperature reponsive device according to claim 3 and in which said extensions are formed as rounded ledges, and slots for a screwdriver extending across the ledges for turning the cylinders with respect to one another.

8. A temperature responsive device for relieving excessive pressure due to an increase in temperature within a closed vessel containing a fluid, said device being sealed within an opening in the vessel and responding to the temperature of the fluid, said device comprising a tubular member having eutectic plugs at its pressurized and unpressurized ends and means sealingly positioned in said tubular member between said plugs and responsive to a predetermined pressure to be ejected from said member whereby should the plug at the pressurized end of said member leak, the pressure within the vessel would cause the plug at the unpressurized end to be ejected and a visual warning as to the leakage would have been given.

References Cited

UNITED STATES PATENTS

| 726,567 | 4/1903 | Philp | 122—504.3 |
| 3,138,406 | 6/1964 | Chamberlain | 301—6 |
| 3,200,987 | 8/1965 | Horner et al. | 301—5 X |
| 3,201,174 | 8/1965 | Stanton | 301—5 |

FOREIGN PATENTS

| 602,561 | 5/1948 | Great Britain. |
| 963,392 | 7/1964 | Great Britain. |
| 975,559 | 11/1964 | Great Britain. |

WILLIAM F. O'DEA, Primary Examiner

R. GERARD, Assistant Examiner

U.S. Cl. X.R.

116—114.5; 301—5